United States Patent

Rose

[11] Patent Number: 6,163,297
[45] Date of Patent: Dec. 19, 2000

[54] APPARATUS AND METHOD FOR LOCATING AN EMITTER USING RF CARRIER OR PRF MEASUREMENT RATIOS

[75] Inventor: Conrad M. Rose, Dahlgren, Va.

[73] Assignee: Litton Systems, Inc., Woodland Hills, Calif.

[21] Appl. No.: 09/421,286

[22] Filed: Oct. 20, 1999

Related U.S. Application Data

[62] Division of application No. 08/996,507, Dec. 23, 1997.

[51] Int. Cl.$^7$ ...................................................... G01S 3/52
[52] U.S. Cl. ................................................................ 342/418
[58] Field of Search ................................... 342/418, 428, 342/430

[56] References Cited

U.S. PATENT DOCUMENTS

| | | | |
|---|---|---|---|
| 3,845,487 | 10/1974 | Lammers | 342/418 |
| 4,040,054 | 8/1977 | Overman . | |
| 5,572,427 | 11/1996 | Link et al. | 342/418 |

OTHER PUBLICATIONS

Boettcher eet al., "Object Oriented Design of Radar Warning Receiver Application Software", Proceedings IEEE/AIAA 10th, pp. 550–554, Oct. 1991.

Becker, K., "A General Approach to TMA Observability from Angle and Frequency Measurements" IEEE, Trans on AES, vol. 32, No. 1, Jan. 1996.

Chan, Y.T. et al, "Sequential Localization of a Radiating Source By Doppler–Shifted Frequency Measurements", IEEE Trans. on Aerospace and Electronic Systems, vol. 28, No. 4, Oct. 1992, pp. 1084–1090.

*Primary Examiner*—Gregory C. Issing
*Attorney, Agent, or Firm*—Lowe Hauptman Gopstein Gilman & Berner, LLP

[57] ABSTRACT

A method and apparatus for determining from a moving observer the location, in terms of latitude, longitude, altitude, and velocity, of a stationary or moving radar emitting a pulsed or continuous-wave signal. The moving observer extracts from the radar signal significant electronic support measures (ESM) parameters, including frequency, pulse repetition interval, and pulse width, and determines from those parameters whether a radio frequency (RF) or pulse repetition frequency (PRF) measurement technique is appropriate, and whether the radar signal angle-of-arrival (AOA) must be computed. The emitter location is computed using a ratio of sequential frequency measurements, and the moving observer continues to collect frequency measurements until the location of the emitter can be established to within a predetermined degree of certainty.

16 Claims, 5 Drawing Sheets

| | |
|---|---|
| Tp | 0.46667 μsec |
| FRI | 8404*Tp |
| P1 | 1919*Tp |
| P2 | 2101*Tp |
| P3 | 1820*Tp |
| P4 | 2564*Tp |

FIG. 5(a)

| Point | Sample Every 100 Seconds Time (sec) | Tp (μsec) | # Pulses |
|---|---|---|---|
| 1 | 109 | 0.4666730892 | 865 |
| 2 | 208 | 0.4666731224 | 805 |
| 3 | 307 | 0.4666731570 | 837 |

FIG. 5(b)

| Point | Delta Tp | | % Err |
|---|---|---|---|
| | Predicted | Measured | |
| 1-2 | 7.29152E-08 | 7.12062E-08 | -2.34 |
| 1-3 | 1.45055E-07 | 1.45391E-07 | 0.23 |

FIG. 5(c)

| Point | Range | | % Err |
|---|---|---|---|
| | Predicted | Measured | |
| 1 | 18.80 | 19.28 | 2.55 |
| 2 | 18.88 | 18.94 | 0.32 |
| 3 | 19.88 | 19.53 | -1.79 |

FIG. 5(d)

APPARATUS AND METHOD FOR LOCATING AN EMITTER USING RF CARRIER OR PRF MEASUREMENT RATIOS

This application is a Divisional of application Ser. No. 08/996,507 filed Dec. 23, 1997.

BACKGROUND OF THE INVENTION

This invention relates to the location, in longitude and latitude, of fixed or moving, pulsed or constant wave (CW) radars by a moving observer. It utilizes either measurements of signal pulse repetition frequency (PRF) ratios or radio frequency (RF) carrier ratios to estimate the emitter's geolocation. It does not estimate the PRF or RF rest frequency of the emitter.

Locating stationary emitters in longitude and latitude, and locating and tracking moving emitters, are important electronic support measures (ESM) system tasks. In particular, it is desirable to upgrade current radar warning receiver (RWR) systems to perform this ESM requirement. In accomplishing this upgrade, it is advantageous to use antennas already installed on the aircraft.

When employing existing antennas, in order to avoid field-of-view restrictions it is necessary that only a single antenna be used to make the measurements from which emitter location is derived. A common method for obtaining range from measurements made utilizing a single antenna is to exploit the change in Doppler on the ESM receiver pulse time-of-arrival (TOA) or RF carrier measurements. The Doppler change measurements are related to the target's location by $$f = f_o \left( 1 - \frac{\vec{v}_r}{c} \cdot \frac{\vec{r}_e - \vec{r}_o}{|\vec{r}_e - \vec{r}_o|} \right)^{(-1)} \quad \text{(Equation 1)}$$

where $\vec{v}_r$=relative emitter—observer velocity $\vec{r}_o$=observer position vector $\vec{r}_e$=emitter position vector $f_o$=emitter rest frequency $f$=Doppler shifted frequency measured at observer.

In this relation, f can be either the RF carrier frequency or pulse repetition frequency (PRF) derived from the pulse TOA measurements.

Direct use of Equation 1 for target location and tracking requires the estimation of all unknowns on the right-hand side. That means $f_o$ must be estimated, as well as the emitter range and relative velocity. Since knowledge of $f_o$ contributes nothing to the emitter geolocation, having to estimate it is generally not desirable.

Yiu-Tong Chan and Frederick L. Jardine in "Target Localization and Tracking from Doppler-Shift Measurements," *IEEE Journal of Ocean Engineering*, vol. 15, July 1990, show how to avoid the need to estimated $f_o$ by making an additional measurement, the rate of change of frequency, $$\frac{df}{dt}.$$

However, the estimation of this rate requires an extended receiver dwell, which is best to avoid if the technique is to be used for emitters that are PRF-coherent but not RF-coherent. If the emitter is not RF-coherent, then the frequency $f$ appearing in Equation 1 must be the PRF frequency, $f_{prf}$. Measuring PRF is a more involved process than measuring $f_{rf}$, the RF carrier frequency.

To measure $f_{prf}$ a pulse deinterleaver extracts the fundamental pulse repetition time interval $t_p$ from the TOA measurement differences; $t_p$ is the greatest common divisor of the time intervals between all emitter pulses. That is, these time differences are integer multiples of $t_p$. Certain fundamental sets of them, characteristic of a given type of radar, are called pulse repetition intervals or PRIs. The fundamental pulse repetition frequency is then obtained from $f_{prf}=1/t_p$.

The PRF frequency measurement made by an ESM intercept receiver typically has an error of $1:10^7$, while the RF carrier can be measured to $1:10^9$. For instance, if a 10 GHz RF carrier frequency is being measured at a 17 dB signal-to-noise ratio (SNR) by an intercept receiver having an effective bandwidth of 20 MHz, and with the signal having a pulse width of 0.1 msec and a PRI of 500 msec, then the measurement off $f_{rf}$ to 5 Hz accuracy can be made within a 0.15-second receiver dwell after collecting approximately 300 pulses. But the measurement of PRF for the same signal to the same accuracy requires at least 0.5 seconds—i.e., 1000 pulses are needed when the receiver has a TOA resolution of 2.5 ns.

Thus, obtaining a PRF rate of change, which requires a linear time variation of the above measurement, may mean a very extended receiver dwell, and this extended receiver dwell adversely affects the time required to detect the presence of emitters at other frequencies. This time-to-detect is a critical ESM system performance constraint, and, because of it, ESM system requirements typically do not allow the use of the Chan and Jardine method for non-RF-coherent emitters.

Another problem with the Chan and Jardine approach, and also with other current Doppler-only methods, is that signal angle-of-arrival (AOA) information is not available until the emitter is located. AOA is generally required in ESM systems soon after initial emitter detection in order to improve situational awareness and aid with possible threat avoidance. This defect can be overcome for emitters that are both stationary and PRF stable by using an alternative approach that resembles bearings-only, rather than Doppler-only, emitter location. This alternative approach is based on initially estimating emitter AOA with the technique disclosed in Shaw et al., U.S. Pat. No. 5,241,313, issued on Aug. 31, 1993. The emitter can then be located with the derived AOA measurements using well-known triangulation methods.

But the Shaw technique cannot be used for CW emitters. Tsui et al., U.S. Pat. No. 5,315,307, issued May 24, 1994, describe a method for extracting AOA from RF carrier measurements. Such an approach, however, requires the emitter to be simultaneously in the field of view of two antennas, and therefore is not a desirable method when using existing RWR antennas.

A further drawback to both the Shaw and Tsui techniques is that they require the estimation of the equivalent of the rest frequency $f_o$. Also, both require that the relative observer-target velocity be known, making neither suitable for moving emitters. Hence, it is not possible to use such techniques to generate AOA for a moving emitter, and to then obtain the emitter track using well-known, bearings-only location methods, such as that described in V. J. Aidala and S. E. Hamel, "Utilization of Modified Polar Coordinates for Bearing-Only Tracking," *IEEE Transactions on Automatic Control*, vol. AC-28, March 1983.

BRIEF DESCRIPTION OF THE DRAWINGS

FIG. 5 presents flight test results depicting the performance of the present invention.

SUMMARY OF THE INVENTION

The drawbacks to current techniques discussed above severely limit those techniques' usefulness in performing single-antenna geolocation and target tracking. The present invention overcomes the limitations of current techniques. It provides a means for locating and tracking emitters which obviates the need to estimate rest frequency, but also provides emitter AOA when needed for both moving and stationary emitters before the emitter location algorithm converges. Of particular importance, the present invention allows the same measurement and estimation process to be used for fixed and moving emitters. Thus, it permits the robust location of emitters that the ESM system ambiguously classifies with respect to motion.

Hence, it is an object of this invention to locate moving or stationary emitters using Doppler measurements made with a single antenna and receiver channel, but not to require the estimation of emitter PRF or RF rest frequency, or frequency rate-of-change.

It is also an object of this invention to obtain emitter AOA when required, but in a manner that does not restrict the method to a bearings-only technique.

Another object of the invention, when locating stationary emitters or tracking moving emitters, is to have the location algorithm process the same measurement for pulsed or CW signals. That is, whether exploiting signal time or frequency Doppler change as the initial measurement in the measurement processing chain, and whether engaging a fixed or moving platform, the basic final measurements, $m_j$, used are frequency ratios formed according to $$m_j = c\left(\frac{f_{j+1}}{f_j} - 1\right) \qquad \text{(Equation 2)}$$

where j and j+1 are indices associating the RF or PRF frequency, $f$, and frequency ratio measurements, $m_j$, to corresponding observer positions (which may not be sequential), and not necessarily associating them with a particular time. In Equation 2, as in Equation 1, c is the speed of light in vacuo.

Another object of the invention is to allow the use of essentially the same processing of these measurements, $m_j$, both to track moving emitters and to extract geolocation for stationary emitters.

Yet a final object of this invention is to provide, as a special case, AOA measurements derived from Doppler change for moving emitters each time the measurement, $m_j$, is generated, and to obtain the emitter track from these AOA measurements using well-known, bearings-only techniques, such as that described by Aidala and Hamel, or the particular bearings-only algorithm described below. This particular algorithm has the advantage of allowing the same location estimation procedure regardless of whether AOA updates are generated at each measurement, $m_j$, and is a key feature of this invention.

DETAILED DESCRIPTION OF THE PREFERRED EMBODIMENTS

Figure 1:
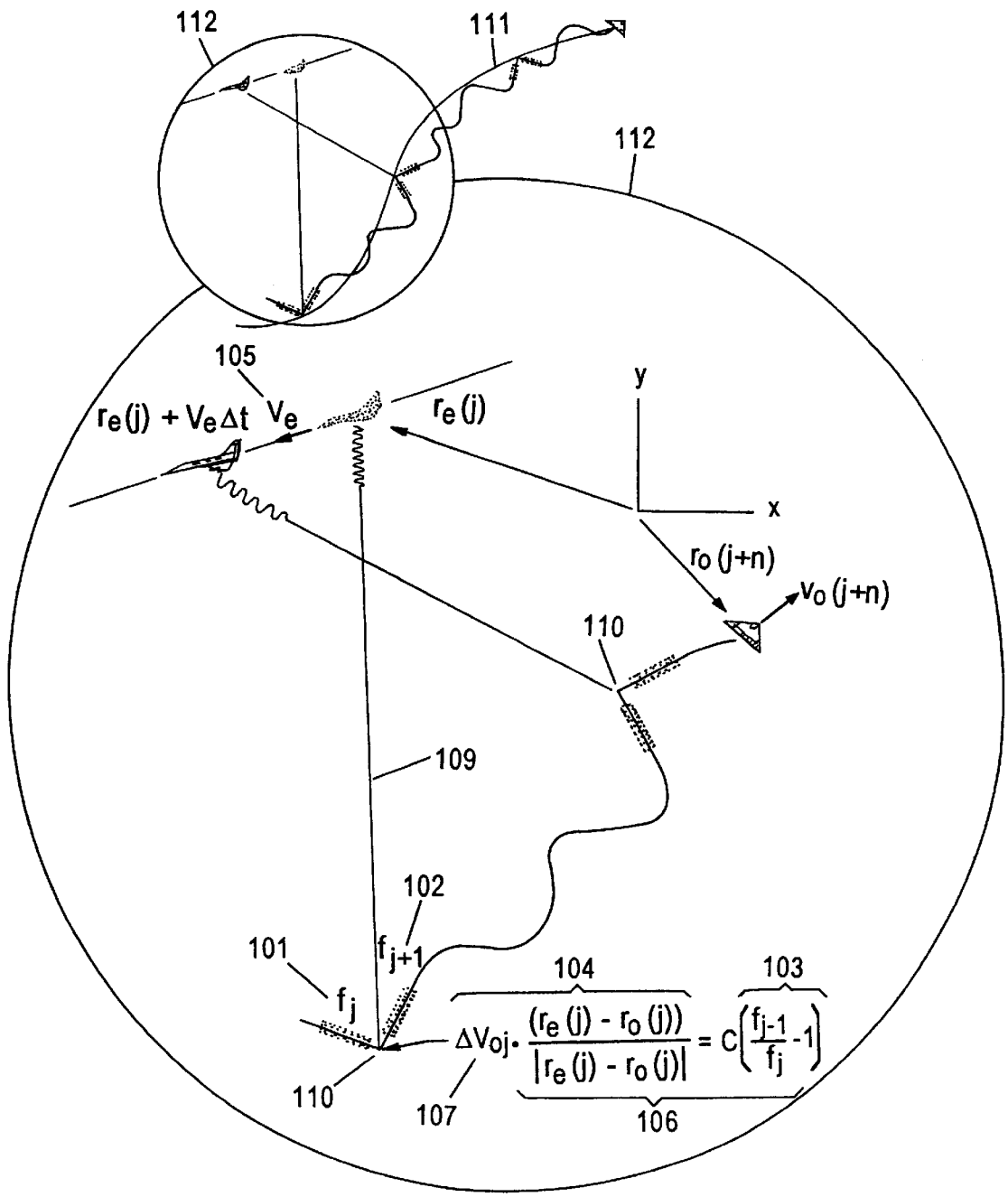
FIG. 1 shows the use of Doppler change measurements to obtain angle-of-arrival to a moving emitter. The emitter is then located using a bearings-only algorithm. The use of the bearings-only algorithm introduces a constraint on the track the observer must fly.

FIG. 1 illustrates the special bearings-only use of the invention. AOAs are produced using a modification of the technique described in commonly assigned patent application, "Apparatus for Measuring Moving Emitter Elevation and Azimuth Direction from Doppler Change Measurement," Ser. No. 08/800,561. As discussed therein, if RF or PRF measurements 101 and 102 are made sequentially during two constant-velocity observer tracks, then when relating the measurement, $m_j$, 103 to the target kinematics 104, the emitter velocity 105 cancels from the Doppler relationship to a good approximation. Hence, the only velocity remaining in the kinematics-Doppler change equivalence 106 is the known observer velocity change 107 between frequency measurements 101 and 102.

The measurement-kinematic relationship 106 can be rewritten $$m_j = \Delta \vec{v}_o(j) \cdot \vec{u}(j) \qquad \text{(Equation 3a)}$$

where, as noted above, $\Delta v_o(j)$ 107 is the change in observer velocity between frequency updates, and U is the emitter signal direction-of-arrival (DOA) vector. The right-hand side of Equation 1 is, therefore, proportional to the emitter cos(AOA), and provides the basis for generating the signal angle-of-arrival 109, which is associated with the vertices 110 at which the requisite observer acceleration occurred.

Since relative bearings are used solely to establish the emitter track, this approach has the usual drawback of bearings-only techniques (as described, for instance, in Fogel and Gavish, "$N^{th}$ Order Dynamics Target Observability from Angle Measurements," *IEEE Transactions on Aerospace and Electronic Systems*, vol. AES-24, May 1988), that is, the observer must maneuver to uniquely locate the target. In the approach described herein, the dogleg maneuver or other acceleration used to establish the AOAs does not satisfy such a requirement. Instead, the envelope 111 of the acceleration vertices 110 shown in FIG. 1 must be established such that the envelope 111 is not a straight line to which a constant-velocity track can be associated.

Flying such a track for observability is not required in a strictly Doppler technique. Also, the requirement to fly short doglegs or to otherwise accelerate between measurements is awkward, and is not strictly required in other Doppler-only approaches. Nor are these restrictions required in the most desirable operation of this invention, in which not every frequency measurement pair in Equation 2 is associated with the emitter AOA, as in Equation 3a.

Figure 2:
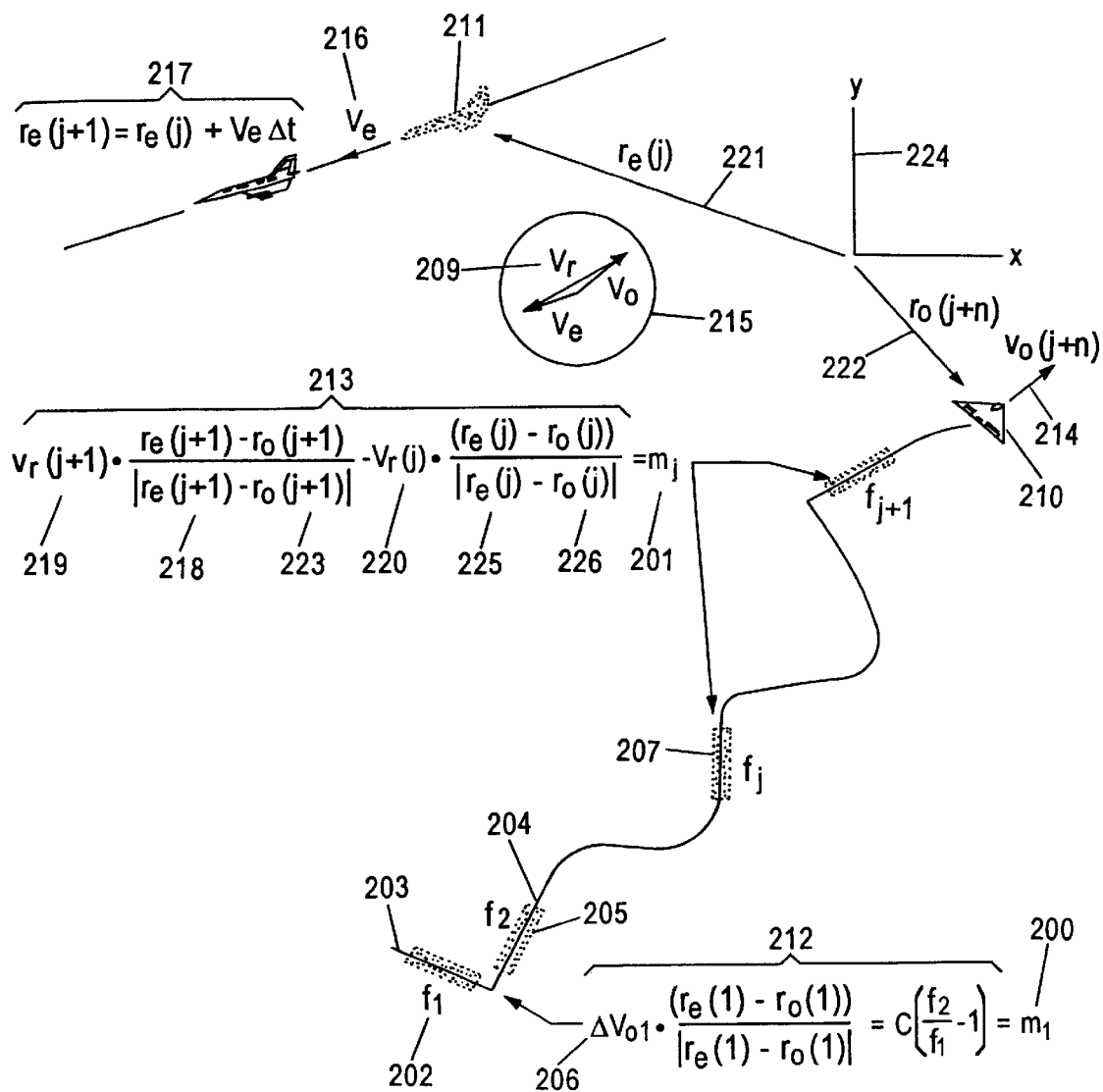
FIG. 2 illustrates how the present invention intermixes frequency measurements separated by different times to avoid a bearings-only approach to target tracking, but still allow for the generation of emitter signal angle-of-arrival before location is complete.

FIG. 2 illustrates how measurements are made in the most desirable operation of the invention. As indicated in FIG. 2, the measurements, m, 200 and 201 in this second embodiment of the present invention, are generated in two ways. When emitter AOA is required, the process just described is used. That is, $f_1$ is measured over first receiver dwell 202, a short time interval during which the observer flies a constant-velocity track 203. The observer then changes heading, speed, or both and flies a second constant-velocity track 204, during which $f_2$ is measured over a second receiver dwell 205. These measurements are now related to the target kinematics rather than cos (AOA) by relationship 212, otherwise represented as $$m_j = \Delta \vec{v}_o(j) \cdot \frac{\vec{r}_e(j) - \vec{r}_o(j)}{|\vec{r}_e(j) - \vec{r}_o(j)|} \quad \text{(Equation 3b)}$$

for use in the track estimation process. AOA is still generated using Equation 3a.

When updates to continue the track estimation process, but not emitter AOA, are needed, the observer flies a single constant-velocity track 207 for the time needed to collect data to measure frequency to the required accuracy. Then the target kinematics related to the ratio measurement is given by the right-hand side of equation 213, or $$m_j = \vec{v}_r(j+1) \cdot \frac{\vec{r}_e(j+1) - \vec{r}_o(j+1)}{|\vec{r}_e(j+1) - \vec{r}_o(j+1)|} - \quad \text{(Equation 3c)}$$
$$\vec{v}_r(j) \cdot \frac{\vec{r}_e(j) - \vec{r}_o(j)}{|\vec{r}_e(j) - \vec{r}_o(j)|}$$

The elements in this equation are defined in FIG. 2. The indices in this case represent sequential updates. Thus, 219 is the relative velocity at the $(j+1)^{th}$ update, while 220 is the relative velocity at the previous update. Both velocities are related to the observer and emitter velocities at the update times by the vector addition 215. This relationship is of particular importance in this invention.

For a stationary emitter, the relative velocity 209 is the negative of the observer's velocity 214, and, therefore, is known. For a moving emitter, the relative velocity is the vector sum 215 of the observer velocity 214 and emitter velocity 216, and is not initially known. Hence, stationary emitters are located—i.e., position 221 in earth fixed coordinate system 224 found in three dimensions—by a set of at least three measurements, $m_j$. But tracking a moving emitter—i.e., finding emitter velocity 216 as well as position 221 so that a prediction can be made as to updated emitter location in formula 217—requires six measurements, since the relative velocity must also be found. In either case, it is desirable to have many more measurements to allow the use of estimation techniques to reduce the effect of measurement errors. These measurement errors include, besides frequency errors, errors associated with the navigation (NAV) system in generating observer locations 222 which appear in the relationships 213 and 212 as a part of the fundamental difference between unknown emitter position, e.g., 218 or 225, and known observer positions 223 and 228.

The estimation procedure uses the recursion formula 217 in emitter position 218 so that only the initial emitter position at the start of the tracking process must be found. If the emitter is stationary, this recursion can still be used. The velocity 216 in that case is estimated eventually to be infinitely small.

Figure 3:
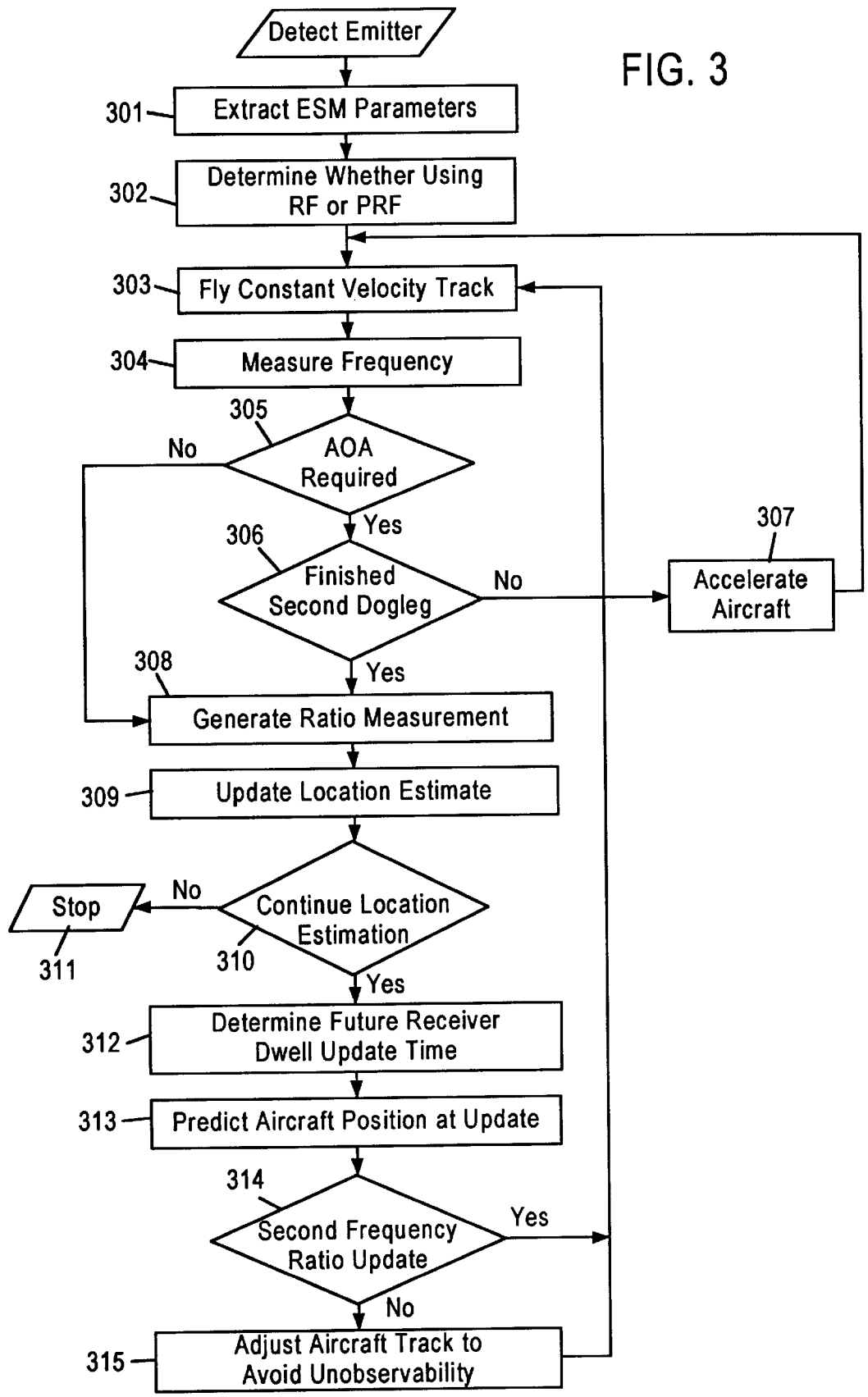
FIG. 3 is a flow chart showing the steps and logic involved in implementing the present invention.

The manner in which any combination of measurements and corresponding kinematic relationships 213 or 212 are used is shown in FIG. 3. As indicated in FIG. 3, after the emitter is detected, emitter parameters are extracted 301 to determine whether PRF or RF is to be used in forming $m_j$. For pulse Doppler radars, RF can typically be used. The use of RF is most desirable, because, as noted above, it is faster than PRF in measuring to the desired accuracy. Acquisition radars employing magnatrons typically require the use of PRF, since the pulsed magnatron does not provide frequency coherence. The classifying parameters obtained in step 301—that is, pulse width, PRI, and frequency (possibly scan rate and scan type also)—allow the determination of the radar class to the extent necessary to determine in step 302 whether PRF or RF is to be used.

Regardless of which measurement is used to generate $m_j$, 303 indicates that a constant-velocity track must be flown during the time the frequency or TOA measurement is being made. The time during which the track is flown varies from milliseconds to seconds depending upon the ESM parameters signal-to-noise ratio (SNR), PRI, and signal pulse width. System parameters such as receiver TOA resolution have a known impact upon the measurement time required, once these ESM parameters are extracted. The ESM parameters are measured in step 301 and are used in 303 to determine the time requirement for the constant-velocity track.

Details of the actual frequency measurement process 304 are set forth on pages 11 et seq. of this specification in connection with the discussion of Pellen's method. The requirement 305 that AOA be obtained before emitter location determines in step 306 whether an immediate acceleration 307 is required of the observer after the frequency measurement is complete. The requirement for AOA is driven by the emitter identification obtained from the parameters extracted in step 301. The acceleration 307 can be a change in heading, speed, or both.

The measurements, $m_j$, are generated 308 and tagged according to whether AOA is required. If AOA is required, it is found in step 309 first by using Equation 3a. The measurement is then associated with the right-hand side of Equation 3b before being appended to the set of previous measurements and used to generate a location update. If no AOA is required, the right-hand side shown in Equation 3c is associated with the measurement. Emitter location updates stop 311 in the iterative estimation process when the location accuracy for stationary emitters exceeds a preset threshold, or until there is no longer the requirement to track a particular moving emitter.

The remaining steps in the flow chart are required to handle the special case when AOA is required at the generation 308 of every measurement update; then Equation 3b alone is used to generate the emitter track. The emitter velocity enters through the relationship 217 (FIG. 2) for the observer position sequential updates 218, but in a relationship of the form 212. In this case, additional constraints must be placed on the observer's track, as indicated in FIG. 1 by envelope 111.

This observability constraint, as described by Fogel and Gavish, is met as follows. Step 312 determines when the next measurement will be made based on a receiver tune table. The tune table is a set of programmed instructions for the receiver which direct the receiver to tune to a specific frequency at a given time. In step 313, current observer position, velocity, and acceleration are used to predict the observer's position at the time of the future receiver dwell. In 314, the next dwell will be the third or greater emitter revisit for generating separate $m_j$, and in step 315 the track is adjusted to assure observability.

These steps 312 through 315 are never required when locating stationary emitters. In many cases, stationary emitters can be unambiguously identified in steps 301 and 302 by correct platform association. When an ambiguity exists, emitter velocity must also be estimated, and, if AOA is needed on every update, steps 312 through 315 are carried out until the velocity is determined to be converging to zero, thereby indicating a stationary emitter.

Figure 4:
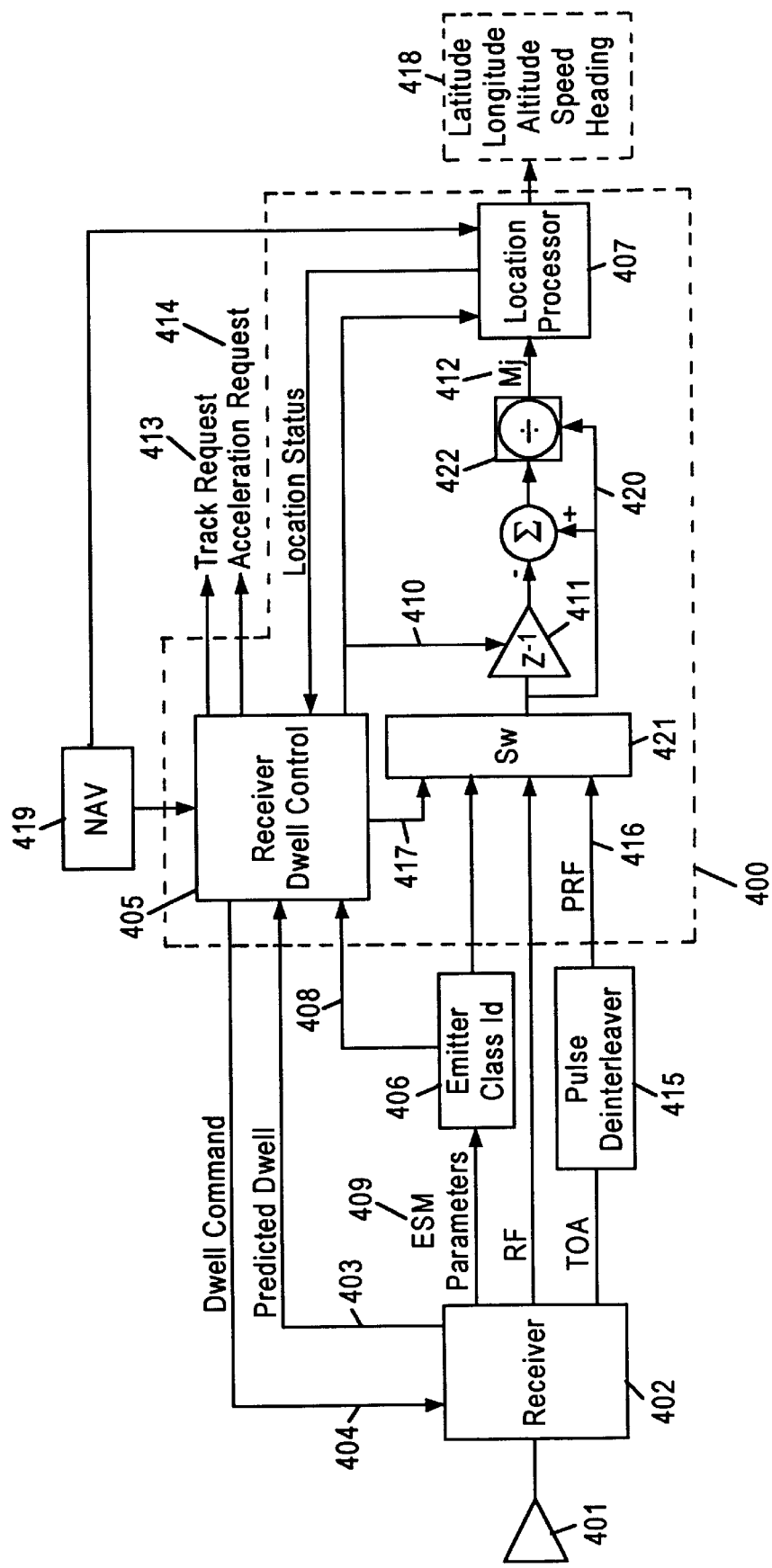
FIG. 4 is a schematic diagram representing a preferred embodiment of the present invention.

FIG. 4 shows the preferred embodiment of the present invention. The various functions shown in FIG. 4 are preferably housed in one enclosure, with the elements inside 400 realized in a reconfigurable field-programmable gate array (FPGA) such as those made by Xilinx. It is not efficient to include the divider 422 in an FPGA, so this function is realized separately by a 16×16-bit parallel multiplier such as those made by Logic Devices Incorporated. When incorporated in an intercept receiver system such as the Litton Amecom LR-100, the FPGA and multiplier would be mounted on a 6U size VMEbus card.

The antenna 401 is one of the existing RWR antennas on the observer aircraft. The receiver 402, which has the capabilities of the LR-100, has a programmable tune table that allows the time of future dwells to be predicted 403. The receiver 402 can also accept dwell commands 404 from the receiver dwell controller 405. The receiver dwell controller 405 contains logic to perform tasks 312 (FIG. 3) (determine future receiver dwell update time), 313 (predict aircraft position at update), and 315 (adjust aircraft track to avoid unobservability during extended times between emitter updates), and to command that task 304 (measure frequency during AOA measurement dwells) be performed. It also determines 417 whether RF or PRF is to be used in the location processor 407. The emitter classification and ID process 406 performs the parameter extraction task 301 and provides the determination of frequency coherence required by the receiver dwell controller 405 to determine 421 the measurement that will be used. The ESM parameters include SNR with PRI and pulse width, and are all used in receiver dwell controller 405 to determine the number of pulses the receiver must collect, or the total time the receiver must dwell, to obtain the needed TOA or RF measurement accuracy. Emitter ID provided by 406 also allows the receiver dwell controller 405 to determine the interval between dwells, and hence control 410, the delay between the frequency updates used to form the ratio measurements, $m_j$ 412. The location processor 407 uses the delay information 410 to determine the association, either Equation 3b or Equation 3c, to make with the measurement 412. For instance, if the moving observer is traveling in a straight path, frequency ratios are associated with the emitter signal AOA. If the observer is performing dogleg maneuvers, frequency ratios are associated with the emitter signal DOA if the time between successive dwell intervals is so short that the change in DOA is insubstantial. In practice, this association is generally employed where the time between successive dwell intervals is less than or equal to 10 seconds. The accuracy required in determining whether the change in DOA is insubstantial is based on the extracted ESM parameters SNR, PRI, and signal pulse width, where these parameters are used to calculate the number of data samples required to achieve the required measurement accuracy. Similarly, for a moving observer performing maneuvers within a known envelope, the frequency ratios are associated with the unknown range to the emitter signal if the time between successive dwell intervals is such that the change in DOA is detectable. In practice, this time between successive dwell periods is typically greater than 10 seconds. For AOA dwells, receiver dwell processor 405, in performing step 315 (FIG. 3), may issue a specific flight path request 413, or intermeasurement acceleration request 414. When requesting specific tracks, the dwell controller 405 uses current position, velocity, and acceleration data from the navigation system 419 and predicted dwell time 403 from the receiver 402.

The RF measurement performed in the receiver is based on Pellen's method ("A Double Nyquist Digital Product Detector for Quadrature Sampling," *IEEE Transactions on Signal Processing*, vol. 40, No. 7, July 1992). Pellen's method is used to generate RF carrier I and Q from data samples at the receiver's IF stage. The I and Q samples are interpolated and ratioed to provide a signal phase measurement, and the frequency is derived from the change in this phase. The PRF measurement is done in the pulse deinterleaver 415. This deinterleaver 415 has the capabilities of the Litton Industries Amecom Division's Advanced ADV-CAP deinterleaver developed for the AN/ALQ-99 jamming system, and, hence, extracts t, from the TOA measurements as part of the pulse deinterleaving process. PRF 416 is simply the inverse of this fundamental interval. The location processor 407 operates iteratively on the measurements to continually refine the estimation of emitter location. The preferred realization of the estimation finction is a maximum likelihood estimator based on the signal model of Equation 3b and Equation 3c. Four dwells are required before the initial longitude, latitude, and altitude of a stationary emitter can be obtained. Seven receiver dwells are required before the track of a moving emitter is initially found. Although 418 indicates the filter outputting a particular set of parameters characterizing the emitter track, other similar sets can be envisioned and may be used.

FIG. 5 shows results from a flight test using the method and apparatus of this invention. The radar that was tracked had an RF carrier frequency of 2.8 GHz and a PRI stability of $1:10^{11}$. Time Doppler was used in this test with the deinterleaver producing the $t_p$ estimates 500. The emitter, the identity of which was not known at the start of the test, was correctly identified by process 406 (FIG. 4) as stationary, and only latitude and longitude were required. Therefore, three receiver dwells were needed. The receiver TOA resolution was 100 ns, and, for this resolution and measured SNR, receiver dwells of approximately 3 seconds each were required to collect the number of pulses 501 (FIG. 5). From these pulses, the deinteleaver 415 (FIG. 4) extracted the average $t_p$ value 502. From this $t_p$, the four PRI values 504 were found, and the frame period FRI 503 was identified. This information, along with the RF frequency and pulse width, was used in an emitter database to correctly identify the emitter type. The FRI was also used to derive the change, $\Delta\ t_p$ 505, between measurements, and by the receiver dwell controller 405 to determine the time for the next dwell command 404 and the delay control 410. The $t_p$ changes are the output of the delay 411, and are used with the $t_p$ values 500, which are fed forward 420 to form the measurement ratios 412. The measurement ratios 412 were then used in the location filter 407 to generate estimates 506 of the emitter location at each point on the observer track where $t_p$ was measured. The estimates were compared with the known emitter positions 507 when the measurements were made, with the resulting errors 508. That is, the estimates were accurate to about 2.5% of the actual range.

Having described the invention in detail and by reference to the preferred embodiment thereof, it will be apparent that other modifications and variations are possible without departing from the scope of the invention defined in the appended claims.

What is claimed is:

1. An apparatus for determining from a moving observer the location, including latitude, longitude, altitude, and velocity, of an emitter from the signal Doppler shift, comprising:

a receiver for receiving one of a continuous wave or pulsed signal;

a frequency measuring device for measuring the emitter signal frequency over sequential dwell intervals;

a time measuring device for measuring the time between successive dwell intervals;

an observer velocity measuring device for measuring a change in observer velocity between successive dwell intervals;

first computing means for computing ratios of the frequency measurements from said frequency measuring device;

logic means for associating said frequency ratios with:
(a) the unknown emitter signal angle-of-arrival (AOA) if the moving observer is traveling in a straight path and the time between successive dwell intervals is sufficiently short such that any change in signal AOA is undetectable from said frequency ratios;
(b) the unknown emitter signal direction of arrival (DOA) if the moving observer is performing dogleg maneuvers and the time between successive dwell intervals is sufficiently short such that any change in signal DOA is undetectable from said frequency ratios;
(c) the unknown range to the emitter signal if the moving observer is performing maneuvers within a known envelope and the time between successive dwell intervals is sufficiently long such that any change in signal DOA is detectable from said frequency ratios;

second computing means for computing emitter location using the measurement ratios received from said first computing means and the association received from said logic means, and determining the angle of arrival if association (a) is used, emitter range if association (b) is used, or sequential changes in emitter range if association (c) is used.

2. An apparatus as claimed in claim 1, further comprising an emitter velocity measuring device for measuring a change in emitter velocity between dwell intervals, wherein
said logic means associates said frequency ratios with AOA or DOA; and
said second computing means computes sequential emitter location and velocity using the observer position and the emitter frequency and change in observer velocity received from said frequency measuring device and said observer velocity measuring device, respectively.

3. An apparatus as claimed in claim 2, further comprising:
prediction means for predicting future AOA or DOA measurements using sequential emitter location estimates from said second computing means;
comparison means for comparing the AOA or DOA computed by said second computing means with the predicted AOA or DOA received from said prediction means, and determining any discrepancies between the two which are not attributable to system noise; and
third computing means for receiving the computed emitter velocity from said second computing means and adjusting the predicted AOA or DOA measurements from said prediction means, such that the discrepancies between the computed AOA or DOA measurements from said second computing means and the predicted AOA or DOA measurements from said prediction means converge to a predetermined minimal level.

4. An apparatus as claimed in claim 3, further comprising:
a storage medium for storing a predetermined set of instructions associated with a range of signal frequencies;

fourth computing means for predicting the position of the observer at the time of a future dwell cycle;
a controller for receiving the set of instructions from said storage means and predicted position from said fourth computing means and directing said receiver to tune to a specific frequency during a particular dwell interval at a particular future time.

5. An apparatus as claimed in claim 1, wherein when the time interval measured by said time measuring device is sufficiently short such that the change in AOA of the emitter signal is undetectable, said logic means associates said frequency measurement ratio with the observer and emitter positions according to $$m_j = \Delta \vec{v}_o(j) \cdot \frac{\vec{r}_e(j) - \vec{r}_o(j)}{|\vec{r}_e(j) - \vec{r}_o(j)|},$$

wherein $$m_j = c\left(\frac{f_{j+1}}{f_j} - 1\right),$$

and whereby c is the speed of light in vacuo, $f$ is the emitter signal frequency, $\vec{r}_e$=emitter position vector, $\vec{r}_o$=observer position vector, $\Delta v_o(j)$ is the change in observer velocity, j is a first instant in time, and j+1 is a subsequent second instant in time.

6. An apparatus as claimed in claim 1, wherein when the time interval measured by said time measuring device is long so that the change in AOA is not negligible, said logic means associates said frequency measurement ratio with sequential observer and emitter positions according to $$m_j = \vec{v}_r(j+1) \cdot \frac{\vec{r}_e(j+1) - \vec{r}_o(j+1)}{|\vec{r}_e(j+1) - \vec{r}_o(j+1)|} -$$

$$\vec{v}_r(j) \cdot \frac{\vec{r}_e(j) - \vec{r}_o(j)}{|\vec{r}_e(j) - \vec{r}_o(j)|}, \quad \text{wherein}$$

$$m_j = c\left(\frac{f_{j+1}}{f_j} - 1\right), \quad \text{and}$$

whereby c is the speed of light in vacuo, f is the emitter signal frequency, $\vec{r}_e$=emitter position vector, $\vec{r}_o$=observer position vector, $\vec{v}_r$=relative emitter-observer velocity, j is a first instant in time, and j+1 is a subsequent second instant in time.

7. A method for determining from a moving observer the location of a radar signal from an emitter, comprising the steps of:
(a) receiving the signal from the emitter;
(b) extracting electronic support measures (ESM) parameters from the signal, said parameters including frequency, pulse repetition interval (PRI), and pulse width;
(c) flying a constant-velocity track with the moving observer;
(d) measuring the signal frequency during said constant-velocity track;
(e) generating a ratio of signal frequency measurements;
(f) associating said ratio of signal frequency measurements with one of emitter signal angle-of-arrival or emitter location;

(g) calculating an estimate of emitter location;

(h) repeating steps (c) through (g) until said calculation of emitter location reaches a predetermined convergence.

8. A method as claimed in claim 7, further comprising the step of determining the length of time of said constant-velocity track based on signal-to-noise ratio (SNR) of the signal measurement, PRI, and pulse width.

9. A method as claimed in claim 7, further comprising the step of determining whether to use an RF or PRF measurement technique.

10. A method as claimed in claim 7, further comprising the step of computing the signal angle of arrival (AOA) before determining emitter location.

11. A method as claimed in claim 7, further comprising the step of computing the time at which a subsequent measurement of signal frequency will be taken, and predicting observer position at said time.

12. A method as claimed in claim 7, wherein step (h) comprises repeating steps (c) through (g) sequentially at least three times to calculate the latitude and longitude of a stationary emitter; at least four times to calculate the latitude, longitude, and altitude of a stationary emitter; and at least seven times to calculate the position and velocity of a moving emitter.

13. A method as claimed in claim 12, further comprising the step of changing at least one of the speed or heading of the observer between two successive constant-velocity tracks.

14. A method as claimed in claim 7, further comprising the step of adjusting the position of the observer, based on the classification of the emitter as moving from the ESM parameters measured in step (b), to assure convergence of said calculation of an estimate of emitter location and velocity to a predetermined level.

15. A method as claimed in claim 13, wherein said frequency measurement ratio is associated with the change in observer velocity and the emitter signal direction-of-arrival to $m_j = \Delta \vec{v}_o(j) \cdot \vec{u}(j)$, whereby $\Delta v_o(j)$ is the change in observer velocity between two successive constant-velocity tracks, $\vec{u}$ is the emitter signal direction-of-arrival vector, and $$m_j = c\left(\frac{f_{j+1}}{f_j} - 1\right),$$

whereby c is the speed of light in vacuo and $f$ is the emitter signal frequency.

16. A method as in claim 7, wherein step (f) further comprises the step of utilizing nonsequential frequency measurements when the emitter is classified as nonmoving.

\* \* \* \* \*